US009082007B2

(12) United States Patent
Smith et al.

(10) Patent No.: US 9,082,007 B2
(45) Date of Patent: Jul. 14, 2015

(54) IMAGE RECREATION USING TEMPLATES

(71) Applicant: BANK OF AMERICA CORPORATION, Charlotte, NC (US)

(72) Inventors: Michael Gerald Smith, Fort Mill, SC (US); Geoffrey Reed Williams, Midlothlan, TX (US); Lisa Gibson, Newnan, GA (US); Craig David Palmer, Mint Hill, NC (US); Eric Scott Sandoz, Concord, CA (US); Melvin Gregory Nixon, Lake Wylie, SC (US)

(73) Assignee: Bank of America Corporation, Charlotte, NC (US)

( * ) Notice: Subject to any disclaimer, the term of this patent is extended or adjusted under 35 U.S.C. 154(b) by 111 days.

(21) Appl. No.: 13/769,012

(22) Filed: Feb. 15, 2013

(65) Prior Publication Data
US 2014/0233836 A1 Aug. 21, 2014

(51) Int. Cl.
G06K 9/60 (2006.01)
G06K 9/00 (2006.01)
G06K 9/34 (2006.01)
G06K 9/18 (2006.01)
G06Q 20/04 (2012.01)
G06T 11/00 (2006.01)
H04N 1/00 (2006.01)

(52) U.S. Cl.
CPC ........ G06K 9/00449 (2013.01); G06Q 20/0425 (2013.01); G06T 11/00 (2013.01); H04N 1/00 (2013.01)

(58) Field of Classification Search
None
See application file for complete search history.

(56) References Cited

U.S. PATENT DOCUMENTS

| 5,182,656 | A  | * | 1/1993  | Chevion et al. | 358/452 |
|-----------|----|---|---------|----------------|---------|
| 5,631,984 | A  | * | 5/1997  | Graf et al.    | 382/317 |
| 6,574,377 | B1 | * | 6/2003  | Cahill et al.  | 382/305 |
| 6,697,512 | B2 | * | 2/2004  | Simonoff       | 382/139 |
| 6,845,366 | B1 | * | 1/2005  | Hassanein et al. | 705/45 |
| 6,886,136 | B1 | * | 4/2005  | Zlotnick et al. | 715/780 |
| 6,903,767 | B2 | * | 6/2005  | Robins et al.  | 348/239 |
| 7,436,979 | B2 | * | 10/2008 | Bruce et al.   | 382/101 |
| 7,729,990 | B2 | * | 6/2010  | Marceau et al. | 705/45  |
| 7,802,721 | B2 | * | 9/2010  | Wilson et al.  | 235/380 |
| 8,526,751 | B2 | * | 9/2013  | Mitchell et al. | 382/239 |
| 8,600,879 | B2 | * | 12/2013 | Reyes          | 705/39  |
| 8,610,966 | B2 | * | 12/2013 | Hatzav et al.  | 358/474 |
| 8,718,367 | B1 | * | 5/2014  | Schneider et al. | 382/176 |
| 8,824,785 | B2 | * | 9/2014  | Ives et al.    | 382/164 |
| 2001/0037297 | A1 | * | 11/2001 | McNair        | 705/40  |
| 2002/0087409 | A1 | * | 7/2002  | Joao           | 705/14  |
| 2007/0043650 | A1 | * | 2/2007  | Hughes et al.  | 705/37  |
| 2007/0150412 | A1 | * | 6/2007  | Lamparello et al. | 705/39 |
| 2010/0030644 | A1 | * | 2/2010  | Dhamodharan    | 705/14.49 |
| 2011/0099067 | A1 | * | 4/2011  | Cooper et al.  | 705/14.53 |
| 2013/0024360 | A1 | * | 1/2013  | Ballout        | 705/39  |

* cited by examiner

Primary Examiner — Soo Park
(74) Attorney, Agent, or Firm — Michael A. Springs; Moore & Van Allen PLLC; Nicholas C. Russell

(57) ABSTRACT

Embodiments of the invention include systems, methods, and computer-program products for providing recreated image documents using templates or generic control documents. In this way, an entity may store limited amounts of image data from an original document and subsequently recreate the document image using document templates. As such, the invention may compile templates for image documents. Upon receiving a document from a transaction for storage, the system may store the metadata associated with that document, instead of storing the entire document as a high resolution image file. Using the template, in combination with the metadata, the system may recreate the image as a system generated image for user recall and reconciliation.

24 Claims, 10 Drawing Sheets

IMAGE RECREATION USING TEMPLATES

BACKGROUND

With advances in technology, entities and individuals alike are starting to store more and more documents, pictures, illustrations, or other images, electronically. In this way, the space required for paper storage is drastically reduced and image data is being stored on computers or databases.

Entities typically receive large volumes of documents from vendors, customers, or employees on any given day. Each document may be saved electronically, thus cutting down on space required for paper storage of the documents.

In some instances, entities are required to store the data for a period of time after receiving it. Furthermore, entities may also have to recall the data.

Therefore, a need exists for a way to limit the storage space required for documents and effectively recall the data, when necessary.

BRIEF SUMMARY

Embodiments of the present invention address the above needs and/or achieve other advantages by providing apparatuses (e.g., a system, computer program product and/or other devices) and methods for recreating images using templates or image lift data. In this way, an entity may store limited amounts of data from an original document and subsequently recreate the document image utilizing templates or image lift data. In this way, the entire document may not need to be stored as an image file, instead critical aspects of the document may be stored. Subsequently, the document image may be recreated using templates or lift technology for reconciliation or the like.

In some embodiments, the invention may receive documents that are to be stored as an image. Typically, images of these documents are captured and stored for recall and regulation purposes. Traditionally, metadata and image data for the entire document may be stored. This may include generic image data, such as the background image of the document, and the like. However, this requires a large amount of data storage to store each of a plurality of documents as an image file with high resolution. The documents may include a myriad of financial documents, including but not limited to checks, lease documents, mortgage documents, deposit slips, payment coupons, receipts, general ledger tickets, or the like.

In the present invention, once the document is received, the invention may capture and process an image of the document. The image document may be used to collect the information associated with the document. This information may include account data, dates, payee, payor, addresses, routing numbers, amounts, document backgrounds, or other information that may be imperative to processing that document. The system may then store the data collected from the document.

In some embodiments, the data collected from the document may be processed and stored as metadata associated with the document. In this way, the image of the document may be captured and the data reprocessed into text or non-image data for storage. As such, numbers, letters, or the like on the document may be captured as part of the document image, but be stored as text data.

In some embodiments, the data collected from the document or portions thereof may be processed and stored as image data. In this way, portions of the image document may be cut out and maintained in storage as an image document. For example, specific elements of a document, such as the portion of a check that has a user signature on it may be captured and stored as an image file instead of being converted to text. In this way, the user's actual signature may still be stored as an image.

In yet other embodiments, some portions of the document may be processed and stored as metadata while other portions of the document may be processed and stored as image data.

Using this data, the system may be able to recreate the document. In some embodiments, recreation of the document image may occur by using templates. In other embodiments, recreation of the document image may occur by using payee lift.

In some embodiments, recreation of the document image may occur via templates. In this way, the system may have previously created and stored generic control documents or templates. These templates may be blank documents that match or correspond closely to a standard document. For example, the system may store a generic control document for a check. This generic control check may look like a standard check image. It may comprise an address line, pay to the order of line, amount line, amount box, memo line, and signature line. However, this generic control document does not have custom user check backgrounds such as animals or the like.

In this way, a request is received from a user who desires to view or retrieve an image document from a previous transaction. The system may then determine the appropriate template matching the request. For example, the user may request an image of a receipt, check, or the like. The system will pull the appropriate template for that request. Next, the system will find the stored metadata associated with the request. In the example of the receipt, the system may find the items purchased, the price, the store, or the like in the metadata stored for that transaction. As such, the system may then join the metadata with the template to generate an image. The image may then be presented to the user in response to his/her request.

In some embodiments, recreation of the document image may occur by using image lift (or payee lift). In this way, the system may combine metadata and image lift data to generate an image document for the user upon request. Image lift, as used herein may refer to the process of lifting one or more areas/elements of a document and storing those areas as image files. These areas may be locations on a document that the user, merchant, financial institution, or the like has hand written or stamped. As such, upon receiving a document for image storage, the system may select specific areas of the document to store as image files, such as a signature block or the like. These lift data portions, along with the metadata may be stored for recreation of the document image.

Subsequently, a request is received from a user who desires to view or retrieve an image document from a previous transaction. The system may retrieve the meta data and any payee lift data pulled for the requested image document. Once the data is pulled for the requested image document, the system may use the metadata in combination with the lifted data to create a generated image of the document. As such, the system may be able to take a template or canned image and add metadata as well as lifted image data to generate an image. This may not be the image captured originally (at the point of transaction), but it will be similar to the captured image, such that the user may use the generated image for reconciliation or the like.

Whether the recreated image is done via templates or payee lift, the recreated image is not the same image that was originally captured. As such, the system does not store a complete image file at high resolution for each document received. Instead, the system stores metadata associated with the document and/or image data for elements of the document (not necessarily the entire document). By only storing elements of the document as image files and/or storing the documents as metadata, the system significantly cuts down on the storage requirements necessary for image document storage and recreation. Furthermore, templates may be utilized to combine the metadata and/or image lift data elements to create a system generated representation of the original document. This way, the user may still be able to view a system generated image document for reconciliation or the like, while the system is able to reduce the storage space necessary for image file storage.

In some embodiments, the metadata and image lift data may be used to analyze user purchase habits. In this way, the system may determine, from metadata and image lift data associated with a document, products or the like that the user may be interested in. As such, the system may be able to use this information to provide product recommendations for the user.

Embodiments of the invention relate to systems, methods, and computer program products for image recreation, the invention comprising: creating one or more generic control documents, wherein the generic control documents are blank templates of transaction documents; receiving an indication of a user transaction, wherein receiving an indication of the user transaction comprises receiving an image of the transaction documents associated with the user transaction; determining data from the transaction documents associated with the user transaction, wherein the determined data is stored; receiving a request for an image of one or more of the transaction documents associated with the user transaction, wherein the request for an image is a request for a generated image; retrieving the stored data from the one or more transaction documents based requested; determining an appropriate generic control document from the created one or more generic control documents, wherein the appropriate generic control document is based at least in part on the image requested; and merging the retrieved stored data from the one or more transaction documents with the determined appropriate generic control document to create a generated image of the one or more transaction documents requested.

In some embodiments, determining data from the transaction documents to store further comprises determining to store the data from the transaction documents as text data and not to store the transaction document as a high resolution image file, wherein the text data further comprises metadata.

In some embodiments, the invention further comprising providing a requestor with the generated image of the one or more transaction document based on the request.

In some embodiments, the appropriate generic control document is a blank template for the requested transaction documents of the user transaction.

In some embodiments, determining data from the user transaction documents to store as text data further comprises determining to store a the transaction document as an image file for a predetermined amount of time and to store the text data for an amount of time longer than the predetermined amount of time.

In some embodiments, transaction documents comprise one or more of a check, deposit ticket, automated teller machine (ATM) receipt, or general ledger ticket.

In some embodiments, creating one or more generic control documents further comprises storing the created one or more generic control documents such that the generic control documents are accessible for create a generated image of the one or more transaction documents requested.

In some embodiments, merging the retrieved stored data from the one or more transaction documents with the determined appropriate generic control document further comprises adding the text data from the retrieved stored data to the appropriate generic control document.

In some embodiments, determining data from the transaction documents associated with the user transaction to store further comprises determining whether the transaction documents are required to be stored as image files for a specific amount of time, wherein storing the transaction documents associated with the user transaction as image files further comprises storing the transaction documents as text data and image data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
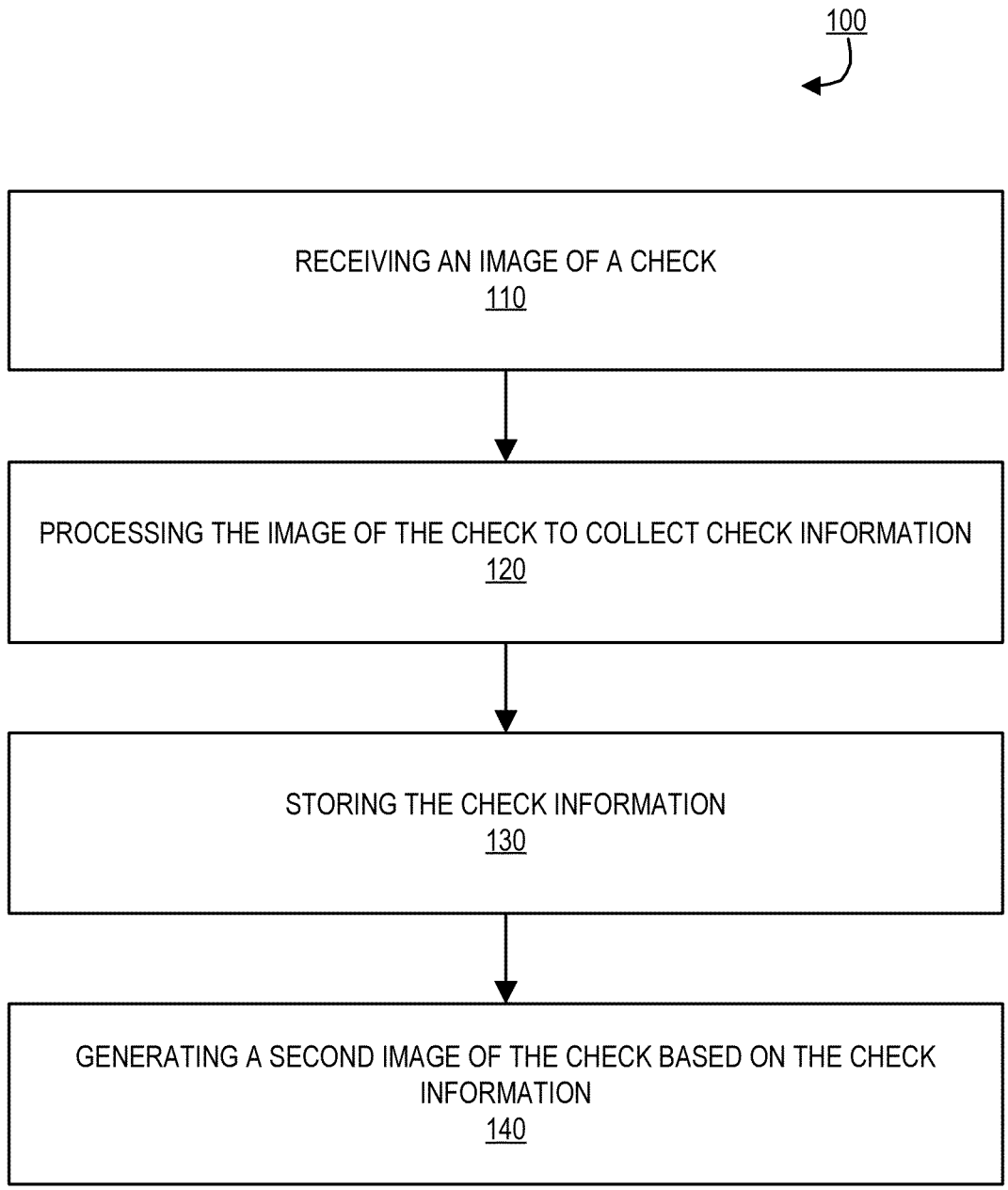
Figure 2:
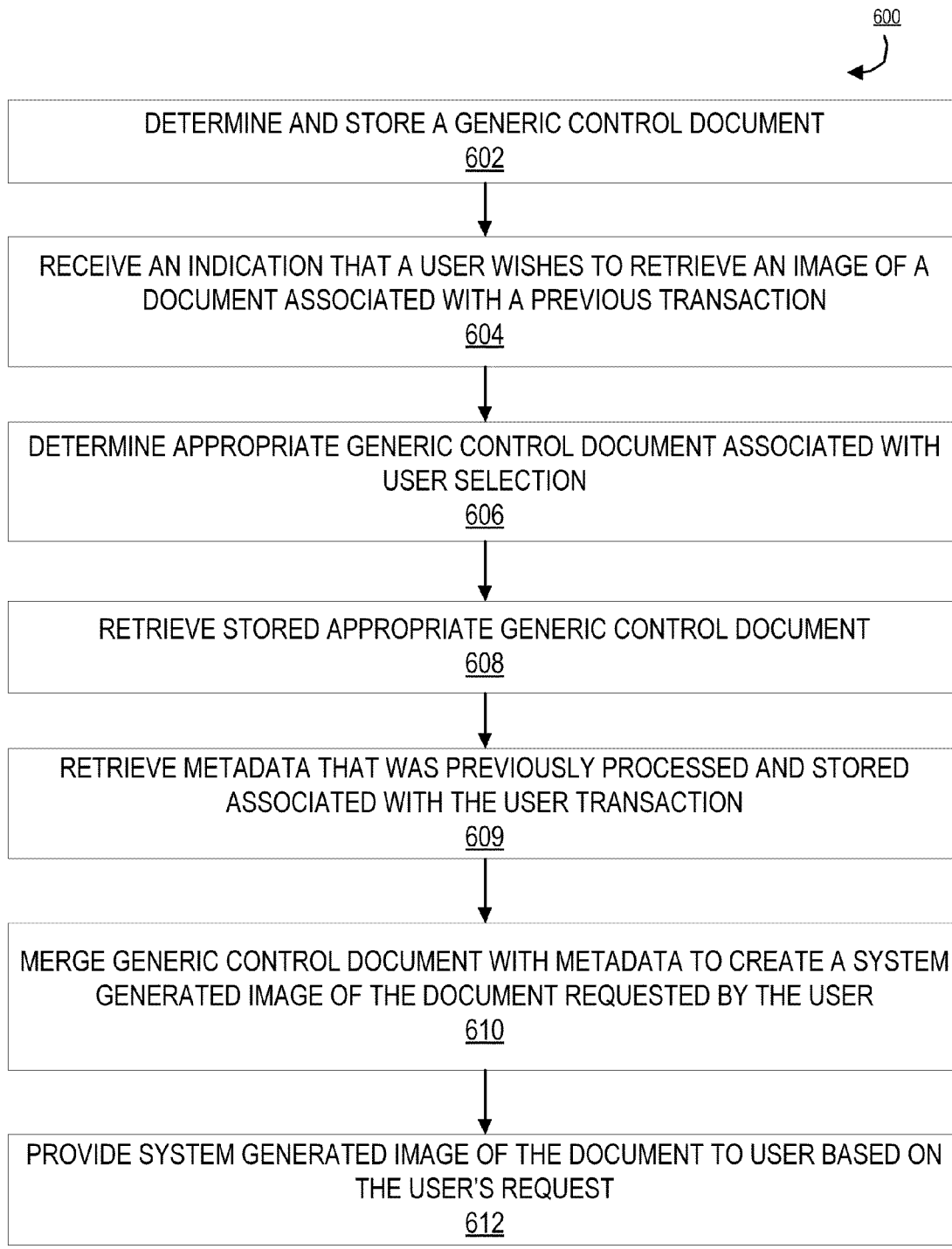
Figure 3:
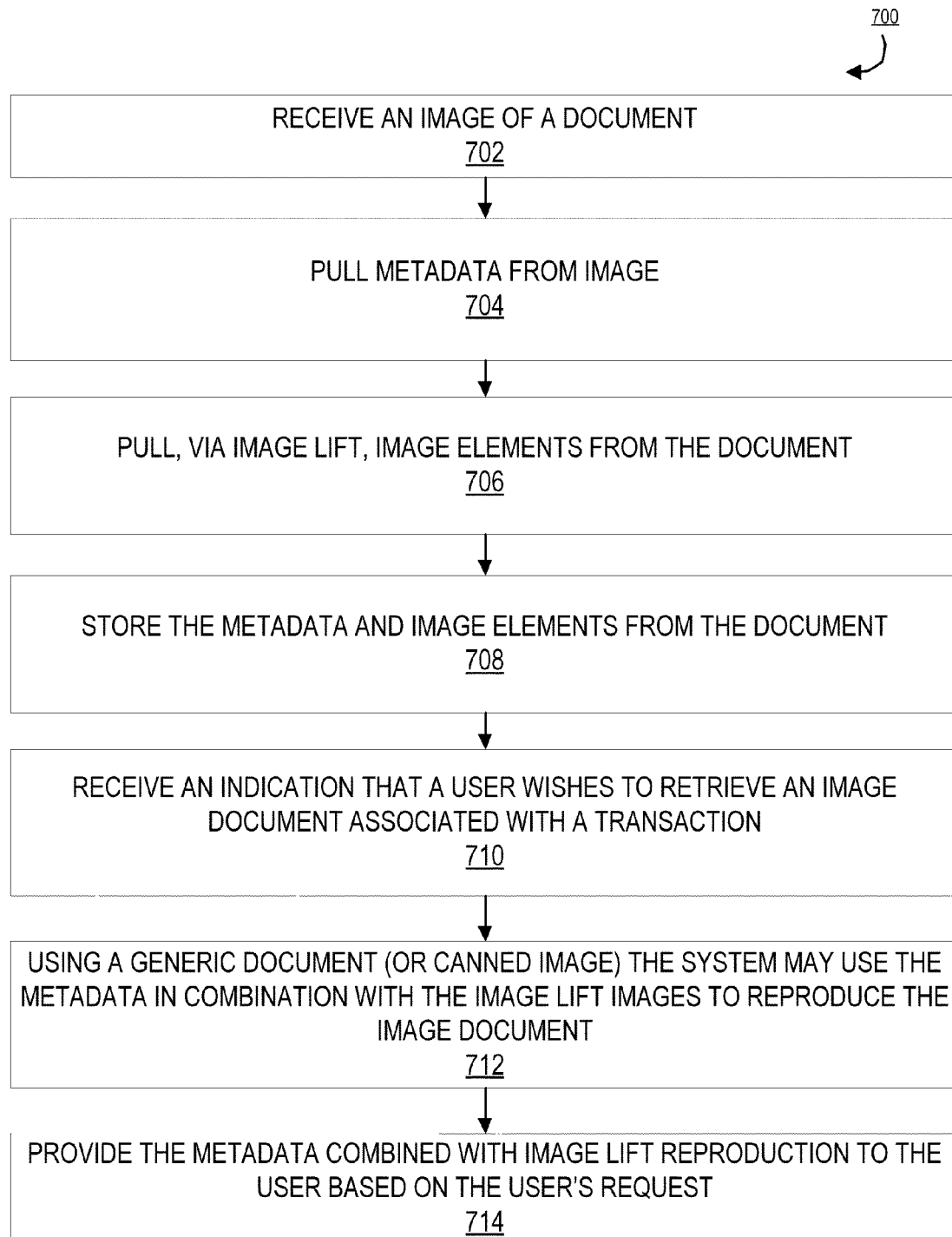
Figure 4:
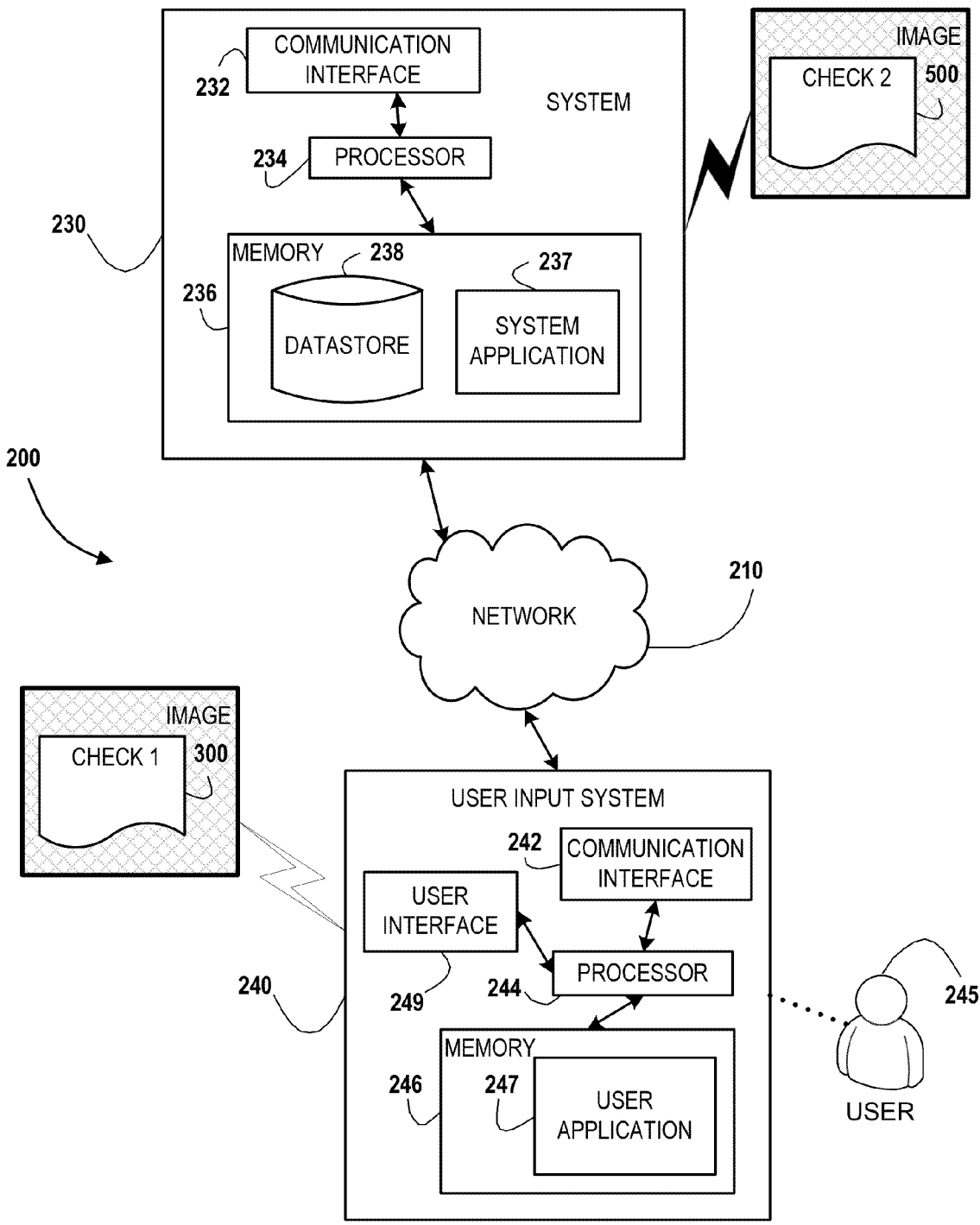
Figure 5:
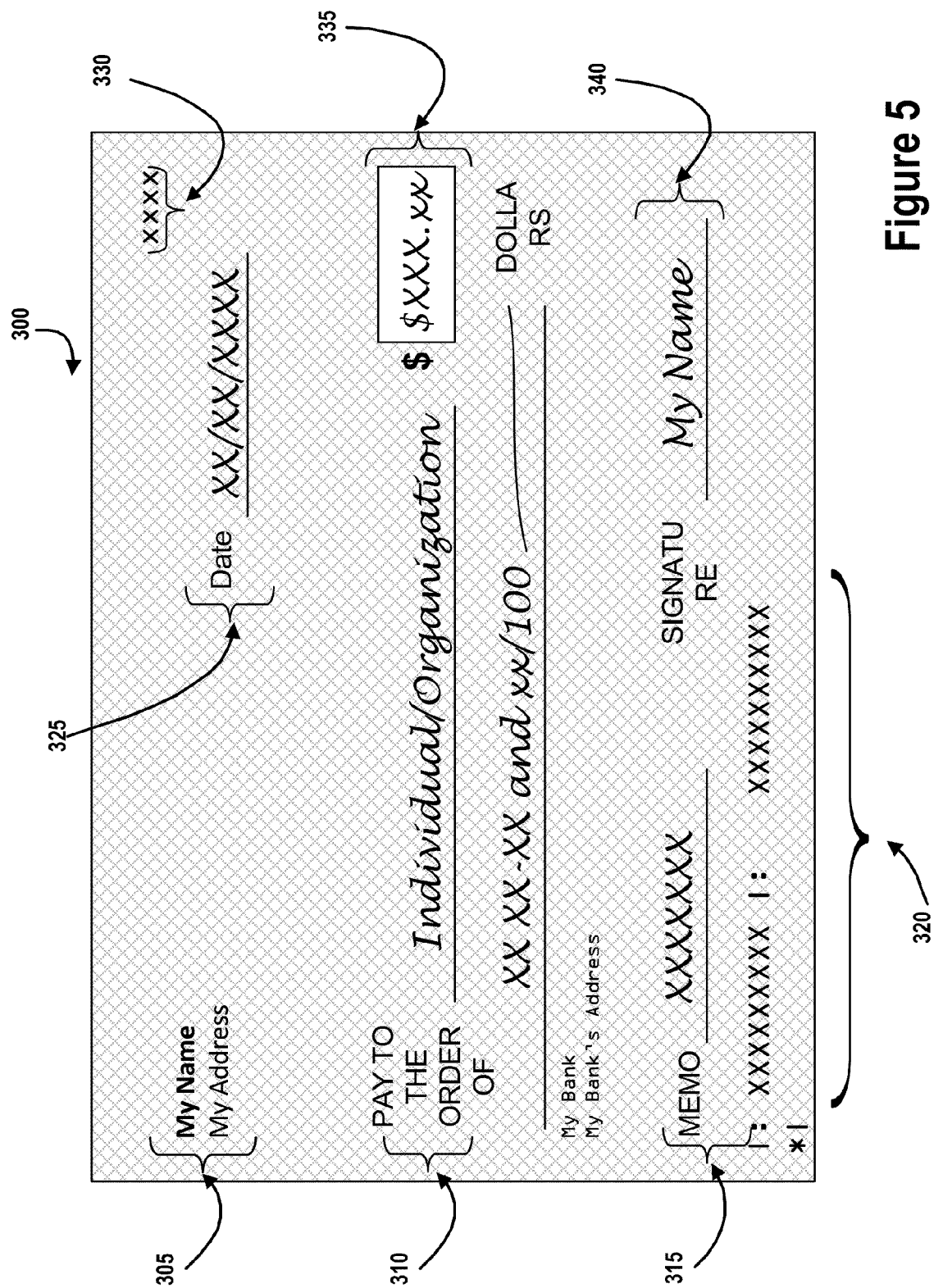
Figure 6:
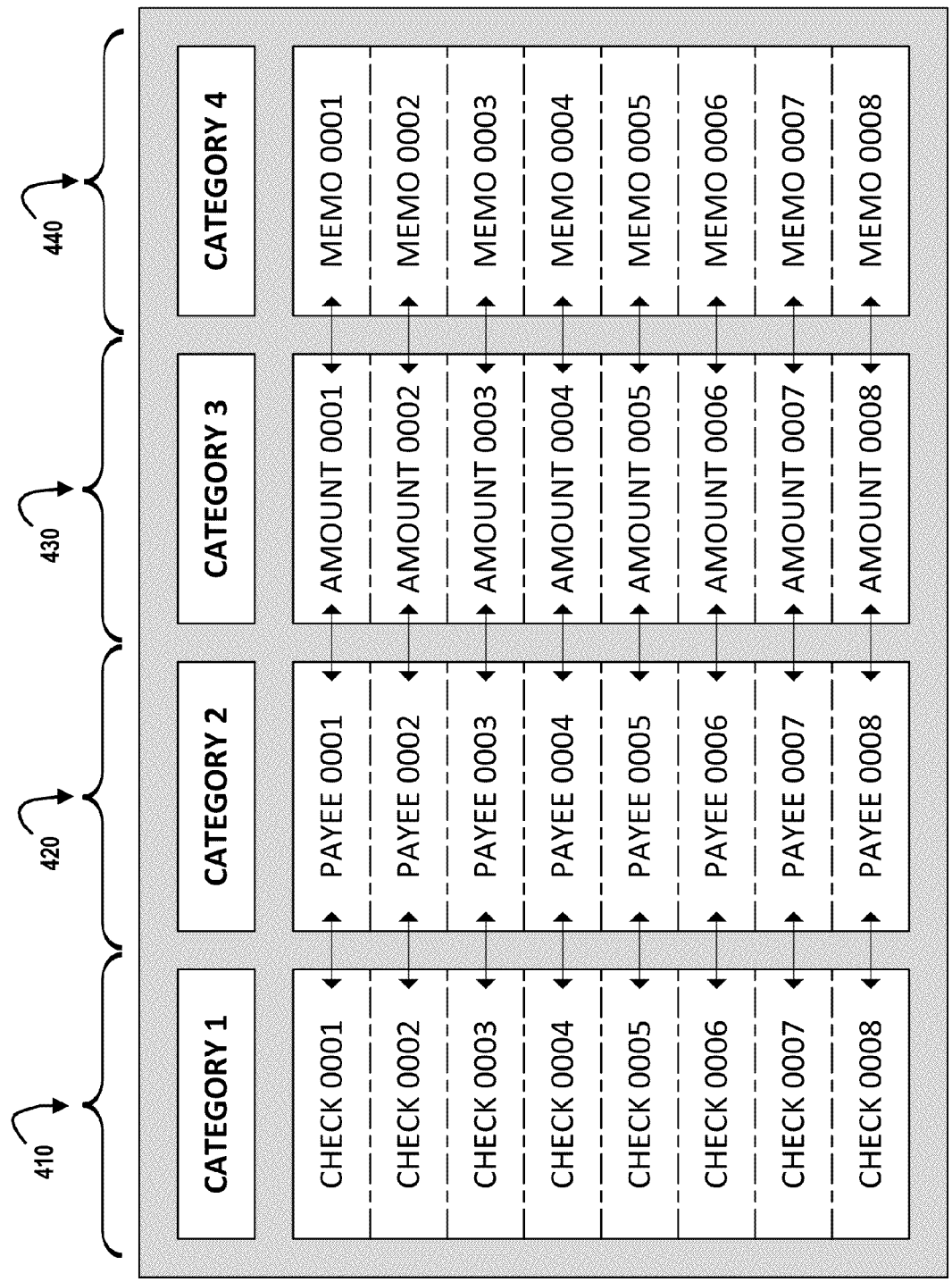
Figure 7:
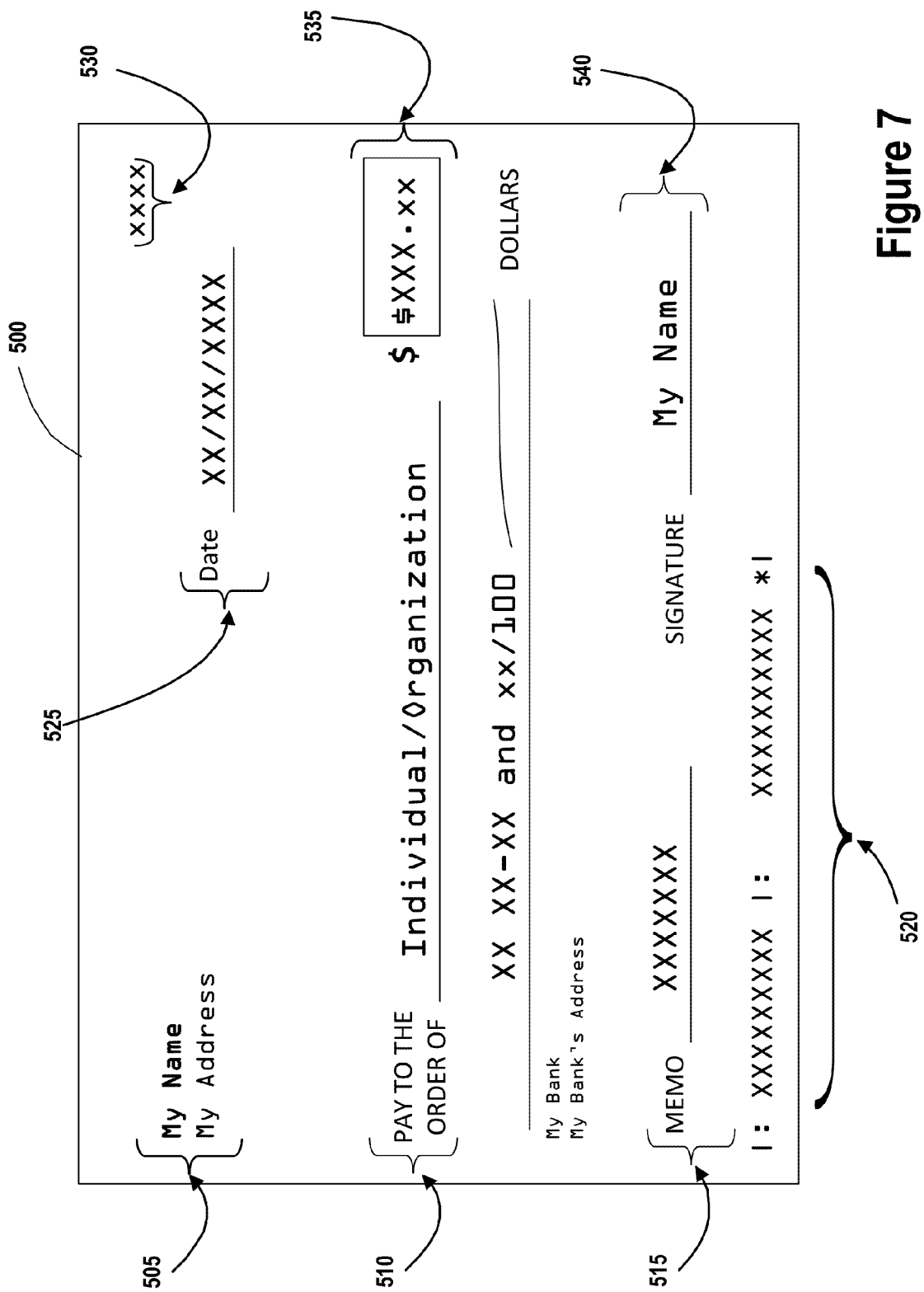
Figure 8:
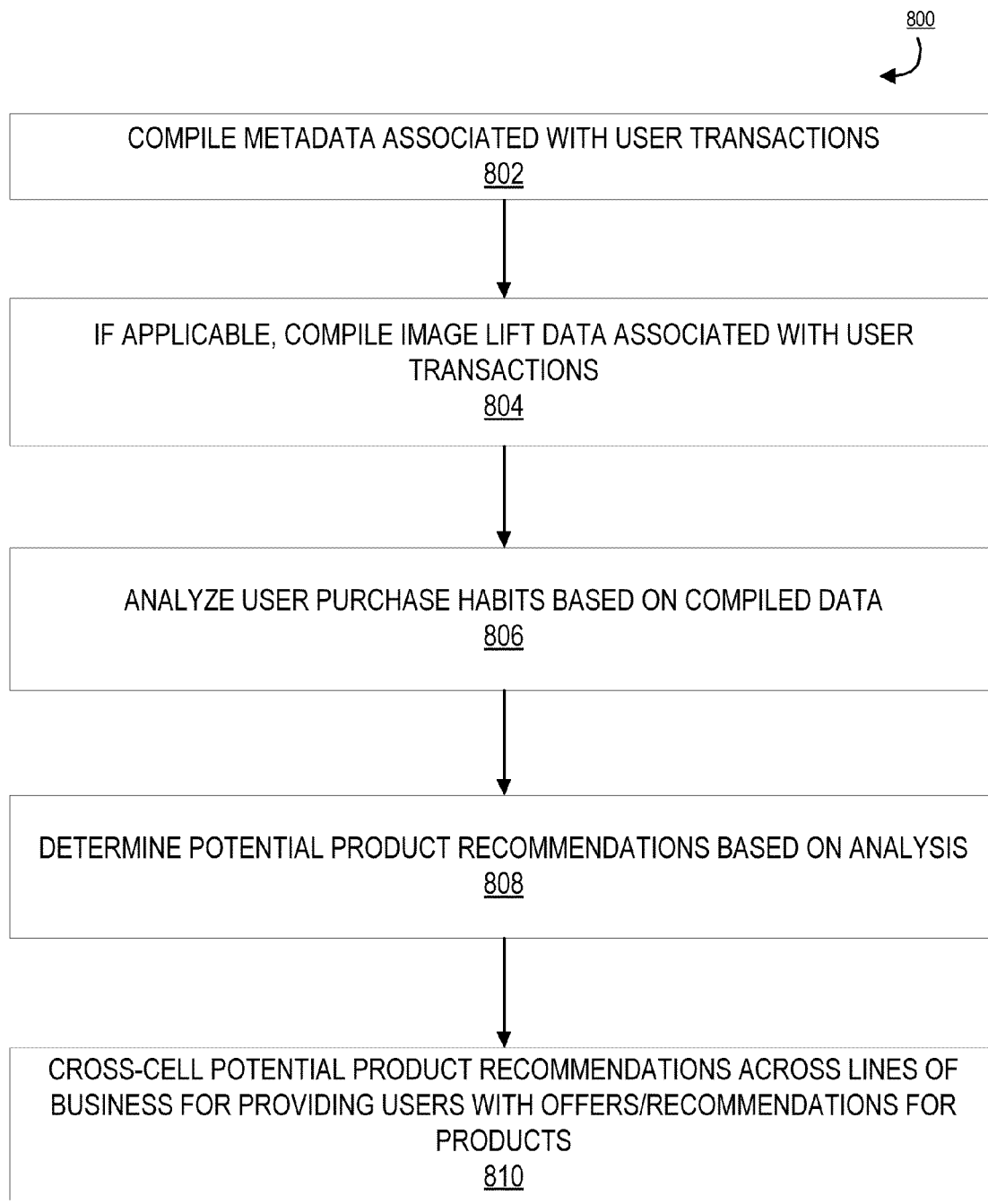
Figure 9:
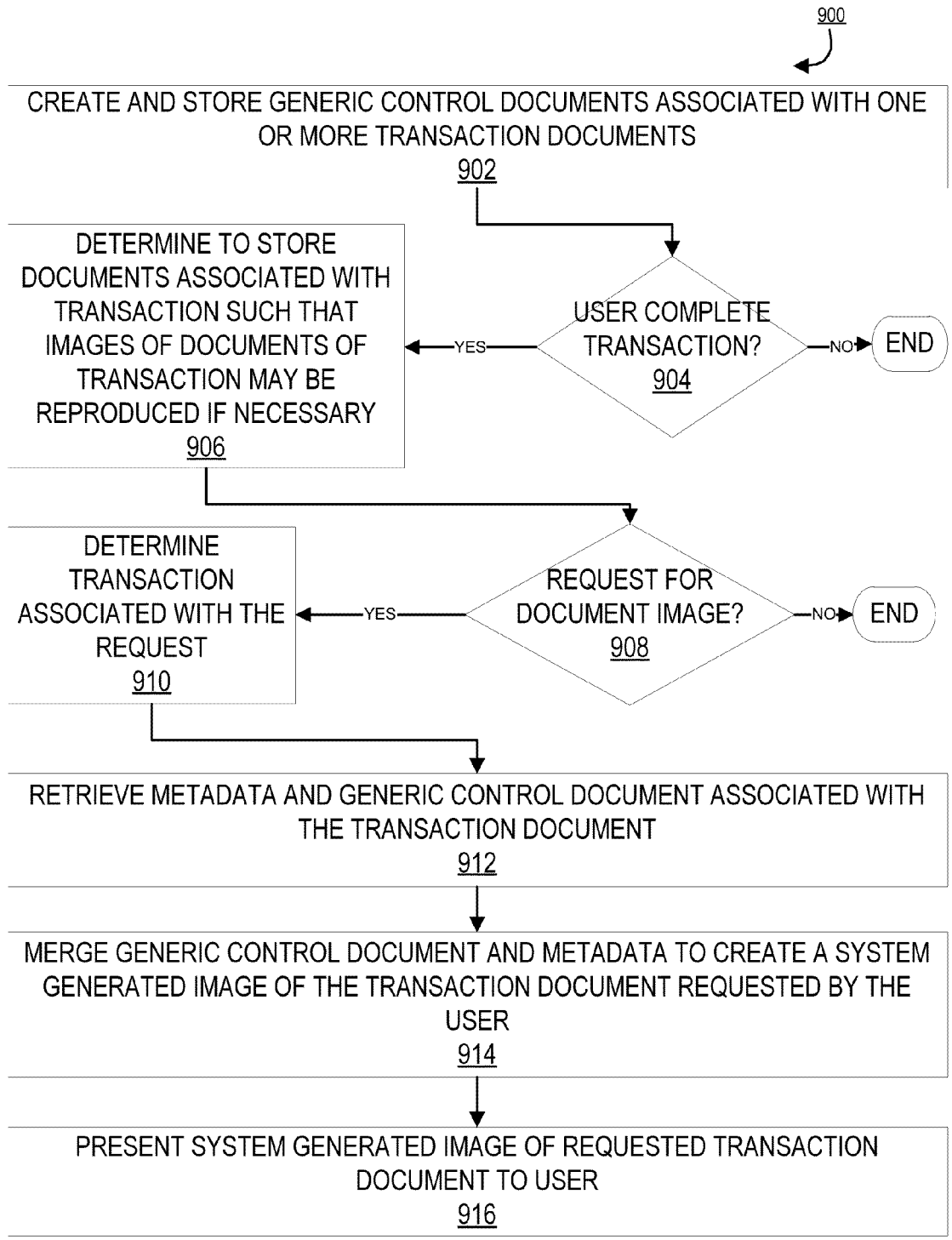
Figure 10:
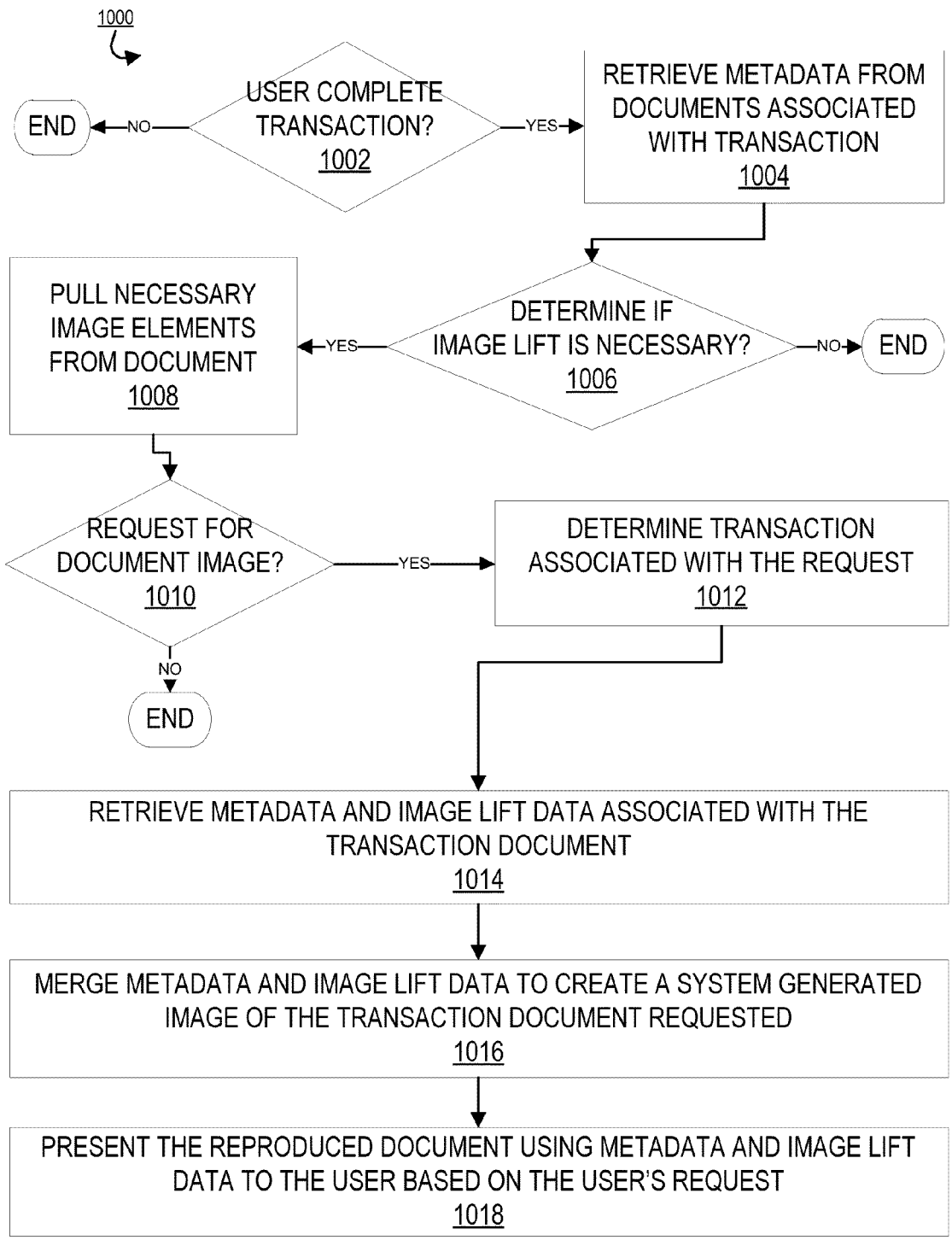

Having thus described embodiments of the invention in general terms, reference will now be made to the accompanying drawings, wherein:

FIG. 1 provides a high level process flow illustrating general image document processing, in accordance with one embodiment of the present invention;

FIG. 2 provides a process flow illustrating image recreation using templates, in accordance with one embodiment of the present invention;

FIG. 3 provides a process flow illustrating image recreation using payee lift technology, in accordance with one embodiment of the present invention;

FIG. 4 provides an image processing and recreation system environment, in accordance with one embodiment of the present invention;

FIG. 5 provides an illustration of an example of an image document, in accordance with one embodiment of the present invention;

FIG. 6 provides an illustration of an example of a datastore for storing document image data, in accordance with one embodiment of the present invention;

FIG. 7 provides an illustration of an example of an image document, in accordance with one embodiment of the present invention;

FIG. 8 provides a process flow illustrating analyzing data associated with image documents for product recommendations, in accordance with one embodiment of the present invention;

FIG. 9 provides a decision process flow illustrating image recreation using templates, in accordance with one embodiment of the present invention; and FIG. 10 provides a decision process flow illustrating image recreation using image lift, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. As used herein, a "check" or a "document" may also refer to a myriad of financial documents, including but not limited to a lease document, a mortgage document, a deposit slip, a payment coupon, a receipt, general ledger tickets, or the like. In some embodiments, the check or document may exist as a physical item printed on paper or other medium. In other embodiments, the check may exist electronically. Furthermore, the term "image lift data" or "payee lift data" may refer to the process of lifting one or more areas/elements of a document and storing those areas as image files without storing the entire document as an image file.

Some portions of this disclosure are written in terms of a financial institution's unique position with respect document processing and retrieving. As such, a financial institution may be able to utilize its unique position to receive, store, process, and retrieve images of documents, such as those of a financial nature.

The present invention is generally centered on document imaging technology (such as check images), such as the receiving, processing, storing, and retrieving of document images, with a purpose of saving storage space in the archive of an entity (e.g., a financial institution). Currently, an entity's check imaging system may receive an image of a check at a high resolution (200 dots per inch (DPI)) and may store the image in the archive at this resolution for a mandated period of seven years. However, regulations may not require that the archived image be of this high resolution. To save storage space in the archive, the present invention may capture pieces of the check information by processing the image of the check and then store the various pieces of the check information as either text or smaller high resolution (or low resolution) images. The pieces of document information may then be retrieved individually or in bulk by an apparatus to generate a second image of the document. Furthermore, the present invention may create a thumbnail version of the image of the check at a lower resolution and store said thumbnail version of the image of the check in the archive for seven years in lieu of storing the high resolution image of the check. A check is an example of a document that may be captured or processed in this invention. In some embodiments, the check may exist as a physical item printed on paper or other medium. In other embodiments, the check may exist electronically.

Referring now to FIG. 1, FIG. 1 presents a high level process flow illustrating general image document processing 100, in accordance with some embodiments of the invention. At block 110, the method comprises receiving an image of a check. In some embodiments, the image of the check may be received by an apparatus (e.g. a computer system) via a user's mobile device, a camera, an Automated Teller Machine (ATM) at one of the entity's facilities, a second apparatus at a teller's station, or the like. In other embodiments, the apparatus may be configured to capture the image of the check. An example of an apparatus that performs block 110 is the user input system 240 in FIG. 4.

At block 120, the method comprises processing the image of the check to collect check information. After the successful retrieval or capture of the image of the check, the apparatus may process the image of the check. The apparatus may capture individual pieces of check information from the image of the check. In some embodiments, the check information may be text. In other embodiments, the check information may be an image. Further processing enables the apparatus to create a thumbnail version (a resized smaller version) of the image of the check at a lower resolution. In some embodiments, the thumbnail version of the image of the check may be created substantially simultaneously to the capture of the image of the check. An example of the apparatus that performs block 120 is system 230 in FIG. 4.

At block 130, the method comprises storing the check information. After the image of the check is processed, the apparatus may store the collected check information. In some embodiments, the check information may be stored as metadata. In some embodiments, portions or elements of the check may be stored as an image. As such, individual elements of the check information may be stored separately, and may be associated with each other via image data or metadata. In some embodiments, the individual pieces of check information may be stored together. In some embodiments, the apparatus may additionally store the original image of the check immediately after the image of the check is received. Because the original high resolution image of the check must be held in storage for a 90 day period, the high resolution image of the check may be deleted 90 days (or any time thereafter) following its capture. In some embodiments, the apparatus may additionally store elements of the check image for data lift. An example of the apparatus that performs block 130 is system 230 in FIG. 4.

At block 140, the method comprises generating a second image, or system generated image, of the check, based on the check information. If the user wishes to view the image of the check, the apparatus may generate a second image of the check based on the stored check information (text, image data lifted, or the like). In some embodiments, pieces of the check information may be requested individually. In these embodiments, pieces of the check information may be delivered individually based on the user's request. For example, if the user wishes to view just the check number, the apparatus may deliver to the user just the check number, not the entire image of the check. In other embodiments, multiple pieces of the check information may be retrieved. For example, if the user wishes to view an image of the entire check, the apparatus may retrieve multiple pieces of check information (a combination of metadata and/or image lift data) and produce for the user an image of the check. In some embodiments, the generated image of the check may accurately present the stored check information on a standard template (e.g. a check with a blank or plain background). In other embodiments, using a template or image data lift, the generated image of the check may not accurately present the background of the check, such as if a unique background image was on the original check.

FIG. 2 illustrates a process flow for image recreation using templates, such as generic control documents 600, in accordance with one embodiment of the present invention. As such, the process 600 recreates a system generated document image using metadata stored from the original document image processing and a template document similar to the original. Prior to initiation of the process 600, the system has received an image of a document, processed the image of the document (and collected information, such as metadata and image data), and stored the metadata associated with the received image of a document. In this way, the system stores the type of document, the appearance of the document, the information on the document, such as numbers, accounts, dates, names, addresses, or the like. As illustrated in block 602, the system first determines one or more various generic control documents and stores the same. Generic control documents, or templates, may be standard documents with no background images or unique features. For example, a template of a check may comprise an address line, a pay to the order of line, an amount line, an amount box, a memo line, and a signature line. This template may have a plan or generic background. As such, unique features about the check may not be illustrated on the template. Unique features such as custom user check backgrounds, or the like.

Next, as illustrated in block 604 of FIG. 3, the system receives an indication that a user wishes to retrieve an image of a document associated with a previous transaction. The request to retrieve an image of a document may come from a user via a user input system, user request at a branch or retail location, or the like. The request may be for any number of reasons such as user reconciliation, recall, return/exchange of product, or the like. A transaction may be a financial transaction, retail transaction, contract, deposit, or the like.

As illustrated in block 606, using the information associated with user's request for an image of a document (or check), the system determines an appropriate generic control document associated with that user's selection. In this way, the system may have previously created and stored generic control documents or templates. These templates may be blank documents that match or correspond closely to a standard document. Next, the system may retrieve the appropriate generic control document from storage, as illustrated in block 608. For example, the user may request an image of a receipt for a previous transaction. The system will search the stored generic control documents and pull the appropriate template for that request, such as the template for that type of receipt. Then, the system may retrieve the metadata that was previously processed and stored (as described above in block 130 of FIG. 1) in association with the user transaction, as illustrated in block 609.

Once the system has retrieved the selected the appropriate generic control document in block 608 and retrieved meta data associated with the user transaction, in block 609 the system may merge the generic control document with the metadata, as illustrated in block 610. This merger creates a system generated image of the document requested by the user. As illustrated in block 612, the user is provided the system generated image of the document based on the user's request. While, in some embodiments, the generated image of the document may not be the exact same as the original captured image (such as check background images, or the like), the image is instead a system generated image that is usable for reconciliation or the like. Furthermore, this process 600 reduces the amount of storage required within a systems data storage or archive, because the entire image is not stored as a high resolution image file. Along with the metadata associated with the original image document, imaged data of the original document may or may not be stored. In some embodiments, the actual image is stored as a thumbnail image. In some embodiments, the actual image is stored at a low resolution. In other embodiments, the actual image is not stored.

FIG. 3 illustrates a process flow for image recreation using image or payee lift technology 700, in accordance with one embodiment of the present invention. As illustrated in block 702, the system receives an image of a document. Initially, the system pulls the metadata form the image of the document, as illustrated in block 704. The metadata includes, but is not limited to the text, numbers, accounts, images, or the like on the document. Once pulled, the system stores the metadata for later searching and retrieving. Next, the system may pull, via image lifting (or payee lift), image elements from the document, as illustrated in block 706. Image lift refers to the process of lifting one or more areas/elements of a document. These elements may be located in one or more various locations on the document. These elements may be handwritten, noted, stamped, or the like, such that these elements are unique and important to the overall document. Next, as illustrated in block 708, the metadata and image elements pulled from the document may be stored within the system database.

As illustrated in block 710 of FIG. 3, the system may receive an indication that a user wishes to retrieve an image document associated with a previous user transaction. As such, using a generic document or canned image the system may use the metadata in combination with the image lift images to reproduce the image document, as illustrated in block 712. For example, if the user requests a check image, the system may pull metadata such as account numbers, addresses, amounts, check numbers, routing numbers, and the like. The system may also pull image lift data, such as the elements of the check written, such as the signature block, handwritten amounts, date, and the like. As such, the system may use a generic check and add the metadata and image lift data to the generic check document. As such, the system will recreate an image of the original check. In some embodiments, the entire check is not recreated exactly, background images on the check may not be recreated. However, the user's signature and writing, as well as the other metadata will be viewable by the user.

Finally, as illustrated in block 714, the system provides the metadata combined with the image life data reproduction image to the user based on the user's request. In this way, the process 700 recreates a system generated document image using metadata and image lift data stored from the processing of the original document image, where the system generated document is similar to the original document.

Referring now to FIG. 4, FIG. 4 presents an exemplary block diagram of the image processing and recreation system environment 200 for implementing the process flow described in FIG. 1 through FIG. 3, in accordance with embodiments of the present invention. As illustrated, the system environment 200 includes a network 210, a system 230, and a user input system 240. Also shown in FIG. 4 is a user 245 of the user input system 240. The user input system 240 may be a mobile device described herein. The user 245 may be a person who uses the user input system 240 to execute a user application 247. The user application 247 may be an application to communicate with the system 230, perform a transaction, input information onto a user interface presented on the user input system 240, request retrieval of image documents, or the like. The user application 247 and/or the system application 237 may incorporate one or more parts of any process flow described herein.

As shown in FIG. 4, the system 230, and the user input system 240 are each operatively and selectively connected to the network 210, which may include one or more separate networks. In addition, the network 210 may include a telecommunication network, local area network (LAN), a wide area network (WAN), and/or a global area network (GAN), such as the Internet. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a tablet computing device, a network device, an ATM, a bank teller's equipment, and/or the like. As illustrated in FIG. 4, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein. Specifically, the user application 247 executes the process flow described in FIG. 1, FIG. 2, and FIG. 3, as well as any other process flow described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information. Additionally, the user input system 240 may include a positioning system. The positioning system (e.g., a global positing system GPS) may enable at least one of the user input system 240 or an external server or computing device in communication with the user input system 240 to determine the location (e.g., location coordinates) of the user input system 240.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols. In some embodiments, the user application 247 may be associated with a mobile device, wherein the mobile device executes a check deposit application. In some embodiments, the user application 247 may be associated with an ATM at one of the entity's facilities. Thus, the ATM may include a check imaging system wherein the check imaging system captures an image of the check. Following successful capture of the image of the check, the ATM may transmit the image to the system 230 for processing, storage, generation of an image of the check, or the like. In other embodiments, the user application 247 may interact with a bank teller, his equipment, a kiosk in the entity's facility, or the like associated with the entity.

Also shown in FIG. 4 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 4 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be a server managed by the entity. The system 230 may be located at the facility associated with the entity or remotely from the facility associated with the entity. In some embodiments, such as the one illustrated in FIG. 4, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, or the like.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols. In some embodiments, the system application 237 may include the processing of the image of Check 1 300 from which the system 230 may collect check information, such as metadata and/or image lift data.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein. For example, the datastore 238 may store information associated with the user's account, check information, or the like. Further, the datastore 238 may comprise an archive, temporary storage locations, or the like.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current. FIG. 4 expresses the datastore 238 and its contents in more detail.

FIG. 4 also shows two document images, such as check images that interact with the system environment 200. The image of Check 1 300 may be the image of the check that is received by the user input system 240. The user input system 240 may collect the check information from the image of Check 1 300. The image of Check 2 500 may be the image of the check that is generated by the system 230. The image of Check 2 500 may be generated based on the check information stored in the datastore 238. Both images of Check 1 300 and Check 2 500 may include an image of the entire check, a thumbnail version of the image of the check, image lift data, individual pieces/elements of check information, or the like.

It will be understood that the embodiment of the system environment illustrated in FIG. 4 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of the process flows described and/or contemplated herein in connection any process flow described herein. Additionally, the system 230 or the user input system 240 is configured to initiate presentation of any of the user interfaces described herein. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. As used herein, an apparatus may refer to at least one of the user input system 240 or the system 230.

Furthermore, the system 230 may use the system application 237 to generate the system 230 generated images using, in some embodiments generic documents and metadata and in other embodiments image lift data and metadata. As such, in some embodiments, the processor 234 may combine the metadata with the generic documents (both stored in the memory 236) and merge/blend the data together. As such, the system generated image may be created. In other embodiments, the processor 234 may combine the metadata with the image lift data (both stored in the memory 236) and merge/blend the data together. As such the system may reproduce the check image.

Now referring to FIG. 5, FIG. 5 illustrates an exemplary image of Check 1 300, the image of the check received by the user input system 240. The image of Check 1 300 may comprise an image of the entire check, a thumbnail version of the image of the check, individual pieces of check information, elements of the check, image lift data, or the like. As one of ordinary skill in the art will appreciate, while Check 1 is being represented in FIG. 5, the check may be any type of document or the like. Check 1 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. The user input system 240 may capture an image of Check 1 300 and transmit the image to the system 230 via a network. The system 230 may collect the check information from the image of Check 1 300 and store the check information in the datastore 238. In some embodiments, the pieces of check information may be stored in the datastore 238 individually. In other embodiments, multiple pieces of check information may be stored in the datastore 238 together. In some embodiments, the pieces of check information may be stored in the datastore 238 immediately following the capture of the image of Check 1 300. In other embodiments, the pieces of check information may be stored in the datastore 238 at a predetermined point in time after the image of Check 1 300 has been captured. The entity may reserve the right to determine the point in time in which the check information is stored in the datastore 238. In some embodiments, the check information may be captured or stored in the datastore 238 at a lower resolution than the original image of the check. In other embodiments, the check information may be captured or stored in the datastore 238 at a higher resolution than the original image of the check. In some embodiments, the check information may be captured or stored in the datastore 238 at a reduced size. In other embodiments, the check information may be captured or stored in the datastore 238 at an increased size.

Now referring to FIG. 6, FIG. 6 illustrates an example of the datastore 238. The system 230 may store the pieces of check information of the processed check in one or more datastores 238. In some embodiments, a datastore 238 may comprise at least one element or image lift data of check information for multiple checks. For example, a datastore 238 may include check numbers (or payee names, check amounts, check dates, signatures, or the like) for multiple checks. In some embodiments this data may be metadata. In other embodiments, this data may be image data for the elements. In other embodiments, multiple checks may share a single datastore 238 for the storage of their check information. Items 410, 420, 430, and 440 represent categories of check information in the datastore 238. For example, categories or elements of check information may include but are not limited to the check number, the payee, the amount of the check, the memo description, the contact information, the date, the signature, the account number and routing number, or the like. Further, associated pieces of check information for a single check may be linked with one another using data or metadata. For example, check number 0001 and payee name 0001 may be associated with each other for ease of access.

Referring now to FIG. 7, FIG. 7 illustrates the image of Check 2 500. The image of Check 2 500 comprises an image of the entire check, a thumbnail version of the image of the check, individual pieces of check information, or the like. The system 230 may retrieve the pieces of check information to generate a new image of Check 2 500. In some embodiments, the retrieved pieces of check information may be presented in the image of Check 2 500 at a lower resolution than the original image of the check. In other embodiments, the check information may be presented in the image of Check 2 500 at a higher resolution than the original image of the check. In some embodiments, the check information may be presented in the image of Check 2 500 at a reduced size. In other embodiments, the check information may be presented in the image of Check 2 500 at an increased size. Check 2 500 may comprise check information, wherein the check information may comprise contact information 505, the payee 510, the memo description 515, the account number and routing number 520 associated with the appropriate user or customer account, the date 525, the check number 530, the amount of the check 535, the signature 540, or the like.

FIG. 8 illustrates a process flow for analyzing data associated with image documents for product recommendations 800, in accordance with one embodiment of the present invention. As illustrated in block 802, the system may compile and store the metadata associated with the user transactions. While, above in FIGS. 1-7, the metadata is stored and used to recreate or reproduce system generated image documents similar to the original document, the data may also be used to provide product recommendations to a user. As illustrated in block 804, not only is the metadata compiled, so is the image lift data, if any is identified and stored in association with an image document.

As illustrated in block 806, the compiled data is used to analyze user purchase habits. In this way, the system may determine potential products of interest to the user based on his/her prior purchases associated with image documents (such as checks, receipts, ATM tickets, deposit tickets, or the like). As such, the system may determine potential product recommendations based on the analysis, as illustrated in block 808. In this way, brands of products, types of products, or categories of products may be determined as potential products of interest to the user based on his/her prior transactions.

Finally, as illustrated in block 810, the system may cross-cell potential product recommendations across lines of business to provide the user with potential offers or recommendations for products based on the user's prior transactions. As such, the system may be able to use this information to provide product recommendations for the user.

FIG. 9 illustrates a decision process flow for image recreation using templates 900, in accordance with one embodiment of the present invention. As illustrated in block 902 the system may initially create and store generic control documents (or templates) for one or more transaction documents. In this way, the system may create standard blank check images, receipt images, ATM receipt images, general ledger account documents, and the like. This way, these general or generic templates may be filled in with metadata associated with a transaction, if an image document is desired. As such, the system may store the templates instead of requiring storing each and every document from each transaction as a high resolution image file. Instead, only templates may be stored as image files and text data from the documents of the transaction may be filled into the template.

As illustrated in decision block 904, it is determined that a user has completed a transaction. If the user has not completed a transaction, the process 900 may terminate. If the user has completed a transaction, a determination is made whether to store the documents associated with the transaction for image recreation using templates. As such, the documents associated with the transaction may be reproduced via recreation using templates, if necessary. If this is the case, the metadata associated with the documents will be stored. In this way, an image file of the documents may not be created. In some embodiments, a low resolution image file of the document may be created and stored for a predetermined amount of time. In other embodiments, a high resolution image file of the document may be created and stored for a predetermined amount of time.

Next, as illustrated in decision block 908, a request for a document image is made. The request may be from a user, entity, or the like. If no request is made in decision block 908, the process 900 is terminated. If a request is made in decision block 908, then the system may determine the transaction associated with the request, as illustrated in block 910.

As illustrated in block 912, once the transaction is identified, the system may retrieve the metadata stored in association with the document of that transaction. Furthermore, the system may retrieve a selected generic control document associated with the transaction document. For example, if the request is for an ATM receipt, the system will pull the metadata or text data associated with that ATM transaction as well as pull a control document, which would be a generic, blank, ATM receipt. The system may then merge the generic control document and metadata to create a system generated image of the transaction document requested, as illustrated in block 914. In this way, the system may merge the blank ATM receipt with the metadata from the ATM transaction to create a system generated ATM receipt. This ATM receipt may have the same information on it, in the same location, as the original ATM receipt. Except, this will not be an image file of the original ATM receipt, instead this will be generated by a combination of an image file for a generic blank ATM receipt and the metadata from that ATM transaction. In this way, the process 900 significantly limits the amount of high resolution image files that need to be stored within an entity.

Finally, as illustrated in block 916, the system pay present the system generated image of the requested transaction document to the requestor.

FIG. 10 illustrates a decision process flow for image recreation using image lift 1000, in accordance with one embodiment of the present invention. First, as illustrated in decision block 1002, it is determined if a user completed a transaction. If no transaction has been completed, the process 1000 may terminate. If a transaction has been completed in decision block 1002, the system may retrieve metadata from documents associated with the transaction, as illustrated in block 1004.

Next, as illustrated in decision block 1006, it is determined if image lift is necessary for the documents of the transaction. If no image lift is necessary, the process 1000 may be terminated. If it is determined that image lift is necessary in decision block 1006, then the system pay pull the necessary image elements from the document, as illustrated in block 1008. Image lift is the process of lifting one or more areas/elements of a document and storing those areas as image files. These may be unique portions of the document, such as a signature or the like.

As illustrated in decision block 1010 a request for a document image is made. As with above, the request may be from a user, entity, or the like. If no request is made in decision block 1010, the process 1000 is terminated. If a request is made in decision block 1010, then the system may determine the transaction associated with the requested document, as illustrated in block 1012.

As illustrated in block 1014, once the transaction is identified, the system may retrieve the stored metadata and image lift data associated with the document of that transaction, as illustrated in block 1014. The system may then merge the metadata and the image lift data onto a canned or generic document to create system generated image of the transaction document requested, as illustrated in block 1016. In this way, while a system generated image of the transaction document is created, the generated image still comprises recognizable characteristics, such as the user's actual signature or the like. In this way, the entity still minimizes storage of high resolution image files, while still providing users with images of transaction documents that are similar to the original document and have recognizable characteristics, such as the user's signature, associated therewith. Finally, in block 1018 the system presents the reproduced document using metadata and image lift data to the user based on the user's request.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for image recreation, the system comprising:
    a memory device with computer-readable program code stored thereon;
    a communication device;
    a processing device operatively coupled to the memory device and the communication device, wherein the processing device is configured to execute the computer-readable program code to:
    create one or more generic control documents, wherein the generic control documents are blank templates of transaction documents, wherein transaction documents are checks;
    receive an indication of a user transaction, wherein receiving an indication of the user transaction comprises receiving an image of the transaction documents associated with the user transaction;
    pull metadata from the image of the transaction document, wherein metadata from the image of the transaction document includes text and numbers typed on the transaction document;
    determine if capturing images of image elements from the transaction document is necessary, wherein image elements are handwritten elements of the transaction document;
    capture images of image elements from transaction document only when it is determined that capturing is necessary;
    receive a request for an image of one or more of the transaction documents associated with the user transaction from the user;
    retrieve the metadata and the captured images from the transaction documents based on the request;
    determine an appropriate generic control document from the created one or more generic control documents, wherein the appropriate generic control document is based at least in part on the transaction document used by the user for the transaction;
    merge the retrieved metadata and the captured image data from the one or more transaction documents with the determined appropriate generic control document to create a generated image of the one or more transaction documents requested; and
    present generated image of the one or more transaction documents requested to the user.

2. The system of claim 1, wherein determining data from the transaction documents to store further comprises determining to store the data from the transaction documents as text data and not to store the transaction document as a high resolution image file, wherein the text data further comprises metadata.

3. The system of claim 1, further comprising providing a requestor with the generated image of the one or more transaction document based on the request.

4. The system of claim 1, wherein the appropriate generic control document is a blank template for the requested transaction documents of the user transaction.

5. The system of claim 1, wherein determining data from the user transaction documents to store as text data further comprises determining to store the transaction documents as an image file for a predetermined amount of time and to store the text data for an amount of time longer than the predetermined amount of time.

6. The system of claim 1, wherein transaction documents comprise one or more of a check, deposit ticket, automated teller machine (ATM) receipt, or general ledger ticket.

7. The system of claim 1, wherein creating one or more generic control documents further comprises storing the created one or more generic control documents such that the generic control documents are accessible for create a generated image of the one or more transaction documents requested.

8. The system of claim 1, wherein merging the retrieved stored data from the one or more transaction documents with the determined appropriate generic control document further comprises adding the text data from the retrieved stored data to the appropriate generic control document.

9. The system of claim 1, wherein determining data from the transaction documents associated with the user transaction to store further comprises determining whether the transaction documents are required to be stored as image files for a specific amount of time, wherein storing the transaction documents associated with the user transaction as image files further comprises storing the transaction documents as text data and image data.

10. A computer program product for image recreation, the computer program product comprising at least one non-transitory computer-readable medium having computer-readable program code portions embodied therein, the computer-readable program code portions comprising:
    an executable portion configured for creating one or more generic control documents, wherein the generic control documents are blank templates of transaction documents, wherein transaction documents are checks;
    an executable portion configured for receiving an indication of a user transaction, wherein receiving an indication of the user transaction comprises receiving an image of the transaction documents associated with the user transaction;
    an executable portion configured for pulling metadata from the image of the transaction document, wherein metadata from the image of the transaction document includes text and numbers typed on the transaction document;
    an executable portion configured for determining if capturing images of image elements from the transaction document is necessary, wherein image elements are handwritten elements of the transaction document;
    an executable portion configured for capturing images of image elements from transaction document only when it is determined that capturing is necessary;
    an executable portion configured for receiving a request for an image of one or more of the transaction documents associated with the user transaction from the user;
    an executable portion configured for retrieving the metadata and the captured images from the transaction documents based on the request;
    an executable portion configured for determining an appropriate generic control document from the created one or more generic control documents, wherein the appropriate generic control document is based at least in part on the transaction document used by the user for the transaction;
    an executable portion configured for merging the retrieved metadata and the captured image data from the one or more transaction documents with the determined appropriate generic control document to create a generated image of the one or more transaction documents requested; and an executable portion configured for presenting the generated image of the one or more transaction documents requested to the user.

11. The computer program product of claim 10, wherein determining data from the transaction documents to store further comprises determining to store the data from the transaction documents as text data and not to store the transaction document as a high resolution image file, wherein the text data further comprises metadata.

12. The computer program product of claim 10 further comprising an executable portion configured for providing a requestor with the generated image of the one or more transaction document based on the request.

13. The computer program product of claim 10, wherein the appropriate generic control document is a blank template for the requested transaction documents of the user transaction.

14. The computer program product of claim 10, wherein determining data from the user transaction documents to store as text data further comprises determining to store the transaction documents as an image file for a predetermined amount of time and to store the text data for an amount of time longer than the predetermined amount of time.

15. The computer program product of claim 10, wherein transaction documents comprise one or more of a check, deposit ticket, automated teller machine (ATM) receipt, or general ledger ticket.

16. The computer program product of claim 10, wherein creating one or more generic control documents further comprises storing the created one or more generic control documents such that the generic control documents are accessible for create a generated image of the one or more transaction documents requested.

17. The computer program product of claim 10, wherein merging the retrieved stored data from the one or more transaction documents with the determined appropriate generic control document further comprises adding the text data from the retrieved stored data to the appropriate generic control document.

18. The computer program product of claim 10, wherein determining data from the transaction documents associated with the user transaction to store further comprises determining whether the transaction documents are required to be stored as image files for a specific amount of time, wherein storing the transaction documents associated with the user transaction as image files further comprises storing the transaction documents as text data and image data.

19. A computer-implemented method for image recreation, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

creating one or more generic control documents, wherein the generic control documents are blank templates of transaction documents, wherein transaction documents are checks;

receiving an indication of a user transaction, wherein receiving an indication of the user transaction comprises receiving an image of the transaction documents associated with the user transaction;

pulling metadata from the image of the transaction document, wherein metadata from the image of the transaction document includes text and numbers typed on the transaction document;

determining if capturing images of image elements from the transaction document is necessary, wherein image elements are handwritten elements of the transaction document;

capturing images of image elements from transaction document only when it is determined that capturing is necessary, receiving a request for an image of one or more of the transaction documents associated with the user transaction from the user;

retrieving the metadata and the captured images from the transaction documents based on the request;

determining an appropriate generic control document from the created one or more generic control documents, wherein the appropriate generic control document is based at least in part on the transaction document used by the user for the transaction;

merging, via a computer processing device, the retrieved metadata and the captured image data from the one or more transaction documents with the determined appropriate generic control document to create a generated image of the one or more transaction documents requested; and presenting the generated image of the one or more transaction documents requested to the user.

20. The computer-implemented method of claim 19, wherein determining data from the transaction documents to store further comprises determining to store the data from the transaction documents as text data and not to store the transaction document as a high resolution image file, wherein the text data further comprises metadata.

21. The computer-implemented method of claim 19, wherein determining data from the user transaction documents to store as text data further comprises determining to store the transaction documents as an image file for a predetermined amount of time and to store the text data for an amount of time longer than the predetermined amount of time.

22. The computer-implemented method of claim 19, wherein creating one or more generic control documents further comprises storing the created one or more generic control documents such that the generic control documents are accessible for create a generated image of the one or more transaction documents requested.

23. The computer-implemented method of claim 19, wherein merging the retrieved stored data from the one or more transaction documents with the determined appropriate generic control document further comprises adding the text data from the retrieved stored data to the appropriate generic control document.

24. The computer-implemented method of claim 19, wherein determining data from the transaction documents associated with the user transaction to store further comprises determining whether the transaction documents are required to be stored as image files for a specific amount of time, wherein storing the transaction documents associated with the user transaction as image files further comprises storing the transaction documents as text data and image data.

* * * * *